United States Patent
Lin et al.

(10) Patent No.: US 9,137,544 B2
(45) Date of Patent: Sep. 15, 2015

(54) METHOD AND APPARATUS FOR DERIVATION OF MV/MVP CANDIDATE FOR INTER/SKIP/MERGE MODES

(75) Inventors: Jian-Liang Lin, Yilan (TW); Yu-Pao Tsai, Kaohsiung (TW); Yi-Wen Chen, Taichung (TW); Yu-Wen Huang, Taipei (TW); Shaw-Min Lei, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 281 days.

(21) Appl. No.: 13/206,891

(22) Filed: Aug. 10, 2011

(65) Prior Publication Data

US 2012/0134416 A1    May 31, 2012

Related U.S. Application Data

(63) Continuation-in-part of application No. 13/089,233, filed on Apr. 18, 2011, now Pat. No. 8,711,940.

(60) Provisional application No. 61/417,798, filed on Nov. 29, 2010, provisional application No. 61/431,454, filed on Jan. 11, 2011, provisional application No. 61/452,541, filed on Mar. 14, 2011.

(51) Int. Cl.
*H04N 19/52* (2014.01)

(52) U.S. Cl.
CPC ..................................... *H04N 19/52* (2014.11)

(58) Field of Classification Search
CPC ....................................................... H04N 19/52
USPC ........................................... 375/240; 348/718
See application file for complete search history.

(56) References Cited

U.S. PATENT DOCUMENTS

| | | | |
|---|---|---|---|
| 2005/0053300 A1* | 3/2005 | Mukerjee | 382/239 |
| 2007/0140353 A1 | 6/2007 | Sun | |
| 2008/0031341 A1* | 2/2008 | Jeon | 375/240.16 |
| 2010/0215101 A1* | 8/2010 | Jeon et al. | 375/240.12 |
| 2011/0211640 A1 | 9/2011 | Kim et al. | |

FOREIGN PATENT DOCUMENTS

| | | |
|---|---|---|
| JP | 2008283490 A | 11/2008 |
| JP | 201016454 A | 1/2010 |

(Continued)

OTHER PUBLICATIONS

Y-W Huang (MEDIATEK) et al: "Video coding 1-15 technology proposal by Mediatek", 1. JCT-VC Meeting; 15-4-2818-23-4-2818; Dresden; (Jointcollaborative Team on Video Coding of ISO/IEC JTC1/SC29/WG11 and ITU-TSG.16 ).

(Continued)

*Primary Examiner* — Dave Czekaj
*Assistant Examiner* — Berteau Joisil
(74) *Attorney, Agent, or Firm* — McClure, Qualey & Rodack, LLP (57) ABSTRACT

A method and apparatus for deriving a temporal motion vector predictor (MVP) are disclosed. The MVP is derived for a current block of a current picture in Inter, or Merge, or Skip mode based on co-located reference blocks of a co-located block. The co-located reference blocks comprise an above-left reference block of the bottom-right neighboring block of the co-located block. The reference motion vectors associated with the co-located reference blocks are received and used to derive the temporal MVP. Various configurations of co-located reference blocks can be used to practice the present invention. If the MVP cannot be found based on the above-left reference block, search for the MVP can be continued based on other co-located reference blocks. When an MVP is found, the MVP is checked against the previously found MVP. If the MVP is the same as the previously found MVP, the search for MVP continues.

18 Claims, 5 Drawing Sheets

(56) References Cited

FOREIGN PATENT DOCUMENTS

| JP | 2010516158 A | 5/2010 |
|---|---|---|
| WO | 2008084997 A1 | 7/2008 |
| WO | 2009115901 A2 | 9/2009 |
| WO | 2010001045 A1 | 1/2010 |
| WO | WO 2010/050706 | 5/2010 |

OTHER PUBLICATIONS

J-L Lin et al: "Improved Advanced Motion 1-15 Vector Prediction", 95. MPEG Meeting; 24-1-2811-28-1-2811; Daegu; (Motion Picture Expert Group or ISO/IEC JTC1/SC29/WG11), No. m18877, Jan. 23, 2811 (2811-81-23.

English language translation of abstract of WO 2010/050706 (published May 6, 2010).

Huang, Y.W., et al.; "Decoder-side Motion Vector Derivation with Switchable Template Matching;" Joint Collaborative Team on Video Coding; Jul. 2010; pp. 1-24.

"Samsung's Response to the Call for Proposals on Video Compression Technology", McCann et al., Document JCTVC-A124, Joint Collaborative Team on Video Coding (JCT-VC) of ITU-T SG16 WP3 and ISO/IEC JTC1/SC29/WG1, 1st Meeting: Dresden, Germany, Apr. 15-23, 2010.

* cited by examiner

METHOD AND APPARATUS FOR DERIVATION OF MV/MVP CANDIDATE FOR INTER/SKIP/MERGE MODES

CROSS REFERENCE TO RELATED APPLICATIONS

The present invention claims priority to U.S. Provisional Patent Application No. 61/417,798, filed Nov. 29, 2010, entitled "New Motion Vector Predictor Set", U.S. Provisional Patent Application No. 61/431,454, filed Jan. 11, 2011, entitled "Improved Advanced Motion Vector Prediction", U.S. Provisional Patent Application No. 61/452,541, filed Mar. 14, 2011, entitled "A Temporal MV/MVP Candidate for Inter, Skip and Merging Prediction Units in Video Compression", and U.S. Non-Provisional patent application Ser. No. 13/089,233, filed Apr. 18, 2011, entitled "Method and Apparatus of Extended Motion Vector Predictor". The U.S. Provisional patent applications and U.S. Non-Provisional patent application are hereby incorporated by reference in their entireties.

FIELD OF THE INVENTION

The present invention relates to video coding. In particular, the present invention relates to coding techniques associated with derivation of temporal motion vector candidate and motion vector prediction candidate for Inter, Skip and Merge Modes.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally. In the rest of this document, MVP may sometimes denote "motion vector prediction" and sometimes denote "motion vector predictor" according to contexts.

In High-Efficiency Video Coding (HEVC) development, a technique named Advanced Motion Vector Prediction (AMVP) is currently being considered by the standard body. The AMVP technique uses explicit predictor signaling to indicate the MVP selected from a MVP candidate set. In HEVC test model version 2.0 (HM-2.0), the MVP candidate set of AMVP includes spatial MVPs as well as a temporal MVP, where the spatial MVPs include two MVPs selected from two respective neighboring groups of the current block. The temporal MVP is derived based on motion vectors from a respective area of a reference picture by mapping the current block from the current picture to the reference picture. The respective area, i.e., the co-located block, in the reference picture may not have the same block size (prediction unit (PU) size) as the current block. When the respective area uses smaller block sizes than the current block, one of the blocks in the co-located block is selected as a co-located reference block. In HM-2.0, the temporal predictor is associated with the center block of the respective area while the previous version of HM uses the above-left reference block of the co-located block. If the MV for the co-located reference block does not exist, the MVP is not available. It is desirable to develop an MVP derivation scheme that can improve the availability of the temporal MVP. The improved MVP derivation scheme may result in smaller motion vector residues and, consequently, better coding efficiency. Furthermore, it is desirable that the MVP derivation scheme will allow the MVP candidate to be derived at the decoder based on decoded information so that no additional side information has to be transmitted.

BRIEF SUMMARY OF THE INVENTION

A method of deriving a motion vector predictor (MVP) for a motion vector (MV) of a current block of a current picture in Inter, or Merge, or Skip mode are disclosed, wherein the MV is associated with the current block and a corresponding block of a target reference picture in a given reference list. In one embodiment according to the present invention, the method and apparatus of deriving a motion vector predictor (MVP) for a MV of a current block in Inter, or Merge, or Skip mode comprise: determining one or more co-located reference blocks, wherein said one or more co-located reference blocks comprise a first reference block of a bottom-right neighboring block of a co-located block; receiving one or more reference MVs (motion vectors) associated with said one or more co-located reference blocks; determining the MVP for the current block based on said one or more reference MVs; and providing the MVP for the current block. One aspect of the present invention is related to the configuration of the co-located reference blocks. In one embodiment, said one or more co-located reference blocks further comprise an inside reference block of the co-located block. For example, the inside reference block may be a center reference block of the co-located block. Furthermore, in another embodiment, said one or more co-located reference blocks further comprise the center reference block of the co-located block, a leftmost reference block of a right neighboring block of the co-located block, and a top reference block of a bottom neighboring block of the co-located block. In yet another embodiment, said one or more co-located reference blocks further comprise the above-left reference block of the co-located block, a leftmost reference block of a right neighboring block of the co-located block, and a top reference block of a bottom neighboring block of the co-located block. In another embodiment of the present invention, if said determining the MVP based on said one or more reference MVs associated with the first reference block of the bottom-right neighboring block does not find the MVP, said determining the MVP will be based on co-located reference blocks different from the first reference block of the bottom-right neighboring block.

DETAILED DESCRIPTION OF THE INVENTION

In video coding systems, the spatial and temporal redundancy is exploited using spatial and temporal prediction to reduce the bitrate to be transmitted or stored. The spatial prediction utilizes decoded pixels from the same picture to form prediction for current pixels to be coded. The spatial prediction is often operated on a block by block basis, such as the 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Consequently, Motion Compensated Prediction (MCP) is often used to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction, respectively, where both list 0 and list 1 can contain multiple reference pictures prior to or/and later than the current picture in the display order. The following describes the default reference picture list configuration. For list 0, reference pictures prior to the current picture have lower reference picture indices than those later than the current picture. For list 1, reference pictures later than the current picture have lower reference picture indices than those prior to the current picture. For both list 0 and list 1, after applying the previous rules, the temporal distance is considered as follows: a reference picture closer to the current picture has a lower reference picture index. To illustrate the list 0 and list 1 reference picture configuration, the following example is provided where the current picture is picture 5 and pictures 0, 2, 4, 6, and 8 are reference pictures, where the numbers denote the display order. The list 0 reference pictures with ascending reference picture indices and starting with index equal to zero are 4, 2, 0, 6, and 8. The list 1 reference pictures with ascending reference picture indices and starting with index equal to zero are 6, 8, 4, 2, and 0. The first reference picture having index 0 is called co-located picture, and in this example with picture 5 as the current picture, picture 6 is the list 1 co-located picture, and picture 4 is the list 0 co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High-Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction in addition to the list 0 prediction.

In video coding systems, motion vectors (MVs) and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years. In this disclosure, MVP may also refer to Motion Vector Predictor and the abbreviation is used when there is no ambiguity. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The motion vector residue is usually termed motion vector difference (MVD) as well. The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

In the H.264/AVC standard, four different types of inter-prediction are supported for B slices including list 0, list 1, bi-predictive, and DIRECT prediction, where list 0 and list 1 refer to prediction using reference picture group 0 and group 1 respectively. When only reference pictures from one reference list (i.e., list 0 or list 1) is used, the prediction is referred to as uni-prediction mode. For the bi-predictive mode, the prediction signal is formed by a weighted average of motion-compensated list 0 and list 1 prediction signals. The DIRECT prediction mode is inferred from previously transmitted syntax elements and can be either list 0 or list 1 prediction or bi-predictive. Therefore, there is no need to transmit information for motion vector in the DIRECT mode. In the case that no quantized error signal is transmitted, the DIRECT macroblock mode is referred to as B SKIP mode and the block can be efficiently coded. Again, a good MVP scheme may result in more zero motion vector residues or smaller prediction errors. Consequently, a good MVP scheme may increase the number of DIRECT-coded blocks and improve the coding efficiency.

In HEVC being developed, some improvements of motion vector prediction over the H.264/AVC are being considered. For Inter and Skip modes in HEVC test model version 2.0 (HM-2.0), multiple spatial MVPs are joined with a temporal MVP for selecting a final MVP for the current block. For Merge mode in HM-2.0, multiple spatial MVPs are also joined with a temporal MVP for selecting a final MVP for the current block. In Merge and Skip modes, the final MVPs are the final MVs because their MVDs are zero by definition. In HM-2.0, the Inter and Skip modes utilize an Advanced Motion Vector Prediction (AMVP) algorithm to select one final motion vector predictor (MVP) within a candidate set of MVPs. The AMVP is proposed by McCann et al., entitled "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr., 2010. The index of the selected MVP is transmitted. In the Skip mode of HM-2.0, the reference index will always be set to 0. In the Inter mode, the reference index is explicitly transmitted to the decoder.

Figure 1:
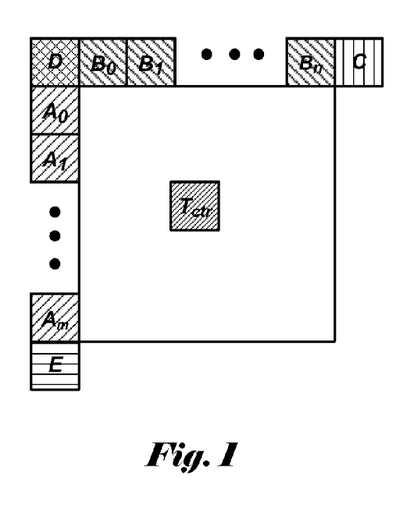
FIG. 1 illustrates neighboring block configuration for deriving spatial/temporal motion vector prediction candidate set for Inter and Skip modes according to High-Efficiency Video Coding test model version 2.0 (HM-2.0).

In existing HEVC, the temporal MVP is derived based on motion vectors from a respective area of a reference picture by mapping the current block from the current picture to the reference picture. The respective area, i.e., the co-located block, in the reference picture may not have the same block size (i.e., prediction unit (PU) size) as the current block. When the respective area uses smaller block sizes than the current block, one of the blocks in the co-located block is selected as a co-located reference block. In HM-2.0, the temporal predictor is associated with the center block of the respective area. The center block has the coordinates of its lower right corner mapped to the center of the current block. However, a block at the upper-left corner of the respective area has been associated with the temporal prediction of AMVP in previous version of HM. FIG. 1 illustrates the candidate set of MVPs used in HM-2.0, which includes two spatial MVPs and one temporal MVP:

1. Left predictor (the first MV available from E, $A_m$, ..., $A_0$),
2. Top predictor (the first available MV from C, $B_n$, ..., $B_0$, D), and
3. Temporal predictor $T_{ctr}$ (a temporal MV, found by mapping the center of the block to its co-located block).

Figure 2:
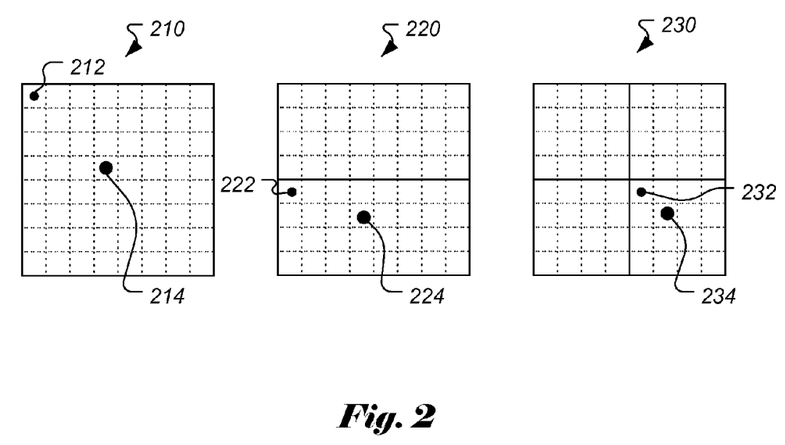
FIG. 2 illustrates an example of temporal predictor by mapping the center of the block to a co-located block instead of the origin of the block.

One MVP index is signaled to indicate which MVP from the candidate set is used. For the left predictor, the MVP is selected as the first available MV from the bottom block to top block which has the same reference picture index as the given reference picture index (it is set to 0 for Skip mode in HM-2.0 and is explicitly transmitted to the decoder for the Inter mode) and the same reference list as the given reference list. For the top predictor, it is selected as the first available MV which is not identical to the left predictor from the right block to the left block in HM-2.0, which has the same reference picture index as the given reference picture index and the same reference picture list as the given reference list. The temporal predictor is determined by mapping the center of the block to a co-located picture, instead of the origin of the block (i.e., the upper left block of the respective area). The location of the center for 3 types of partitioning of a 32×32 CU, i.e., 2N×2N 210, 2N×N 220 and N×N 230, is shown in FIG. 2. The centers and origins of the blocks are indicated by reference numbers 214, 212, 224, 222, 234, and 232 respectively.

Figure 3:
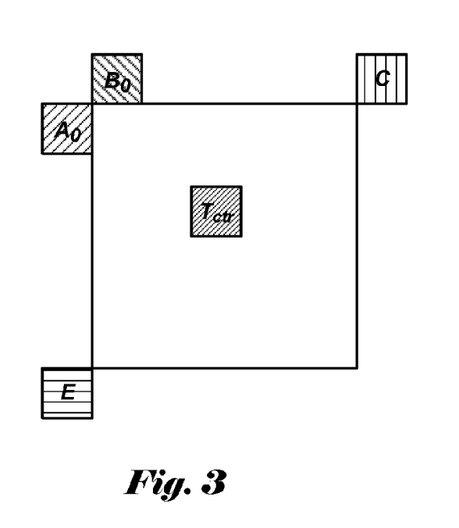
FIG. 3 illustrates neighboring block configuration for deriving spatial/temporal motion vector prediction candidate set for Merge mode according to HM-2.0.

In HM-2.0, if a block is encoded as a Merge mode, one MVP index is signaled to indicate which MVP from the candidate set is used for this block to be merged. FIG. 3 illustrates the neighboring block configuration for deriving the MVP for Merge mode. The candidate set includes four spatial MVPs and one temporal MVP:

1. Left predictor ($A_0$),
2. Top predictor ($B_0$),
3. Temporal predictor $T_{ctr}$ (a temporal motion vector, found by mapping the center of the block to a co-located picture),
4. Right-Top predictor (C), and
5. Left-Bottom predictor (E).

Figure 4:
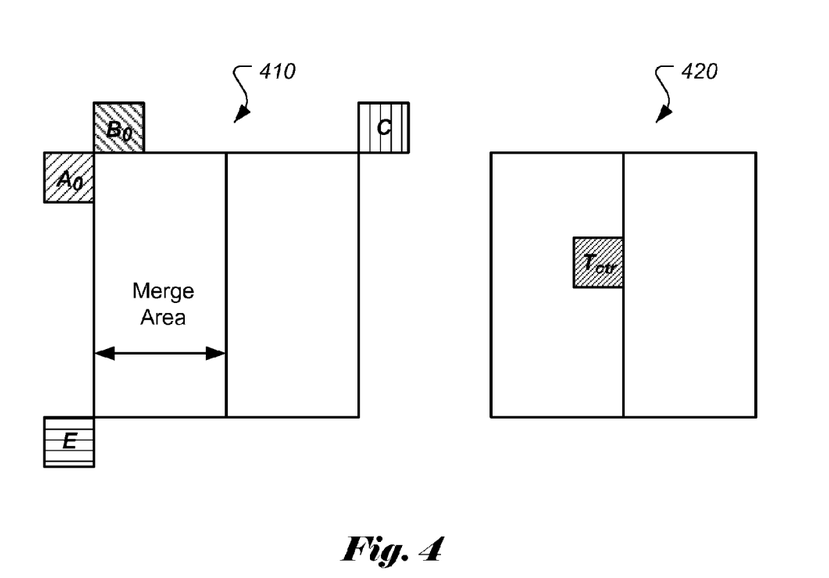
FIG. 4 illustrates neighboring block configuration for deriving spatial/temporal motion vector prediction candidate set for Merge mode for a first N×2N PU according to HM-2.0.
Figure 5:
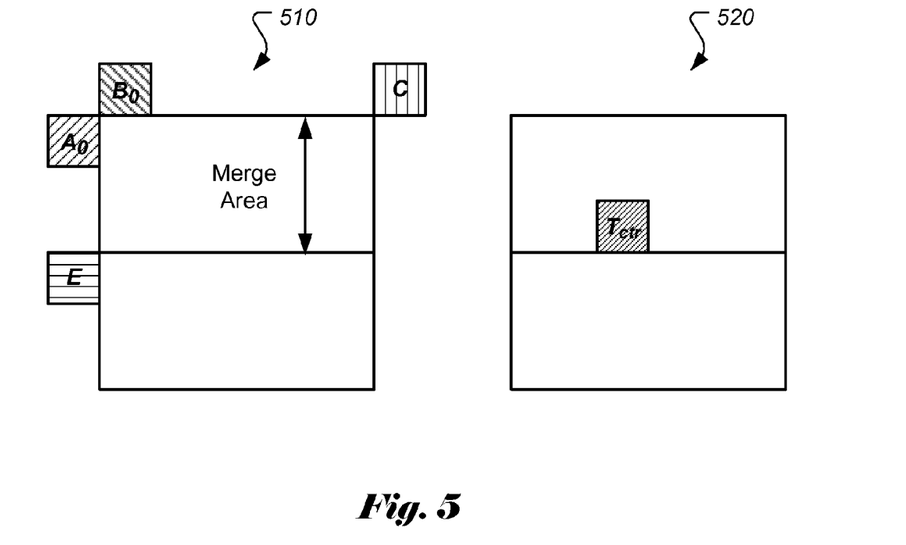
FIG. 5 illustrates neighboring block configuration for deriving spatial/temporal motion vector prediction candidate set for Merge mode for a first 2N×N PU according to HM-2.0.

For the spatial MVPs in Merge mode, the reference picture index will be set to the same as the reference picture index from the selected block. For example, if block C is selected according to the MVP index, the MV and the reference picture index from the block C are used for merge, i.e. the MV and reference picture index from block C are used for current PU. If the block has two MVs, the two MVs and their reference picture indices are used for bi-prediction. In particular, each CU can be merged as a whole (i.e. 2N×2N merge) or partially merged. If partition type N×2N or 2N×N is selected for Inter predicted CU, the first partition (i.e. PU) of this CU is forced to Merge mode in HM-2.0. That is, the first PU of an N×2N or 2N×N CU will not have its own motion vector; instead, it has to share one of its neighboring blocks' motion vectors. At the meantime, the second N×2N or 2N×N PU can be in either Merge mode or Inter mode. The MVPs for the first N×2N PU are shown in FIG. 4, where the spatial MVPs are indicated by reference number 410 and the temporal MVP is indicated by reference number 420. The MVPs for partial merge of the first 2N×N PU are shown in FIG. 5, where the spatial MVPs are indicated by reference number 510 and the temporal MVP is indicated by reference number 520.

Figure 6:
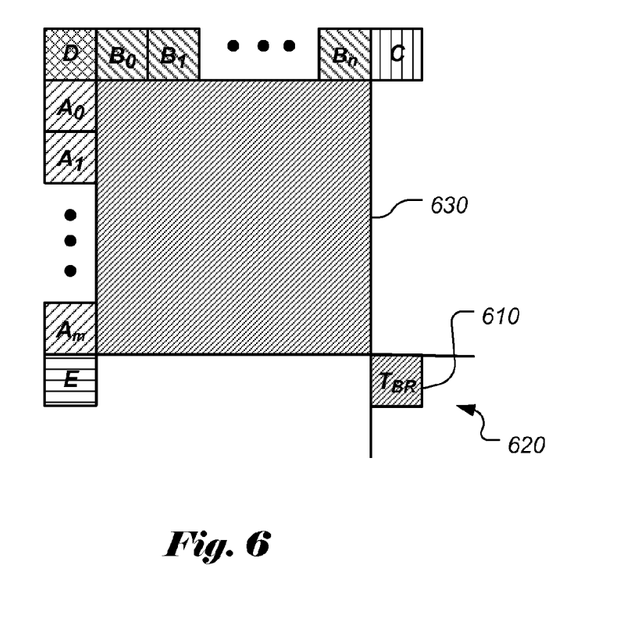
FIG. 6 illustrates neighboring block configuration for deriving spatial and temporal motion vector prediction candidate set for Inter and Skip modes according to one embodiment of the present invention.
Figure 7:
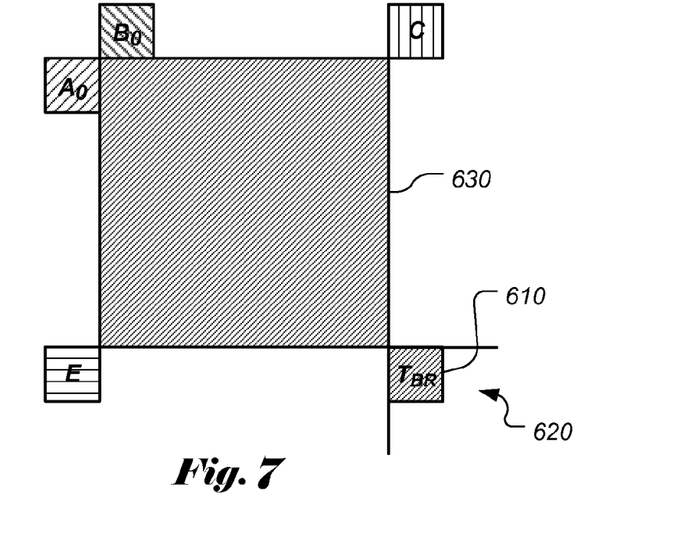
FIG. 7 illustrates neighboring block configuration for deriving spatial/temporal motion vector prediction candidate set for Merge mode according to one embodiment of the present invention.

As mentioned before, AMVP is an effective means for reducing the information associated with transmission of an underlying motion vector. The efficiency of AMVP depends on the availability of MVPs and the quality of the MVPs (i.e., accuracy of the MVP). When an MVP is not available, the underlying MV has to be transmitted without prediction or with a prediction value 0 or other default value. It is desirable to improve the MVP availability and quality. Accordingly, extended temporal search scheme according to various embodiments of the present invention is disclosed. According to one embodiment of the present invention, the temporal MVPs for a motion vector (MV) of a current block of a current picture is derived based on one or more co-located reference blocks of the co-located block, wherein said one or more co-located reference blocks comprise a block from the bottom-right neighboring block of the co-located block. For example, above-left reference block 610 of bottom-right neighboring block 620 of co-located block 630 of the reference picture can be used as a co-located reference block in the Inter or Skip mode as shown in FIG. 6. Similarly, above-left reference block 610 of bottom-right neighboring block 620 of co-located block 630 of the reference picture can be used as a co-located reference block in the Merge mode as shown in FIG. 7.

Figure 8:
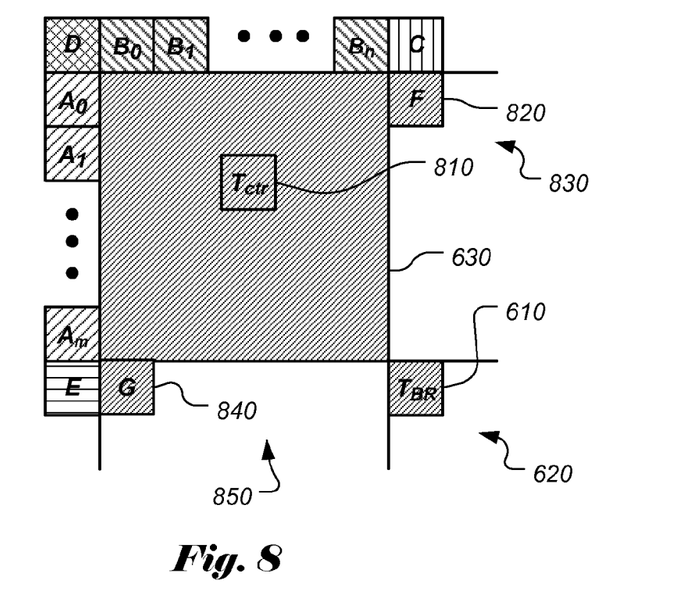
FIG. 8 illustrates neighboring block configuration for deriving spatial/temporal motion vector prediction candidate set for Inter and Skip modes according to another embodiment of the present invention.
Figure 9:
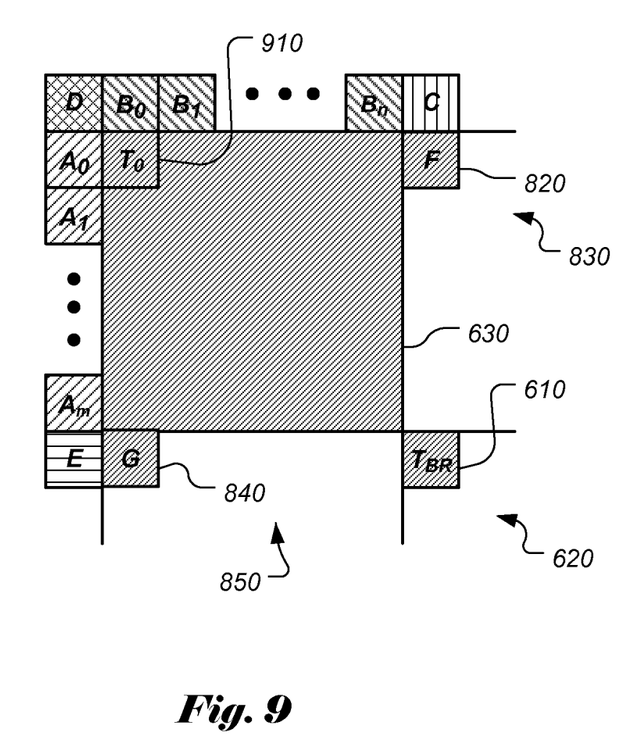
FIG. 9 illustrates neighboring block configuration for deriving spatial/temporal motion vector prediction candidate set for Inter and Skip modes according to yet another embodiment of the present invention.

While the HM-2.0 and its previous version only use one co-located reference block, an embodiment according to the present invention allows using more than one co-located reference blocks. FIG. 8 illustrates an example of using more than one co-located reference blocks where the co-located reference blocks include above-left reference block 610, center reference block 810 of the co-located block, leftmost reference block 820 of right neighboring block 830 of co-located block 630, and top reference block 840 of a below neighboring block 850 of co-located block 630 in the Inter or Skip mode. A leftmost reference block of the right neighboring block refers to a reference block that is at the most left side of the right neighboring block in this disclosure. In other words, the leftmost reference block of the right neighboring block is a block in the right neighboring block that is adjacent to the co-located block. Leftmost reference block 820 shown in FIG. 8 is the top reference block of the leftmost reference blocks. A top reference block of the below neighboring block refers to a reference block that is at the top side of the below neighboring block in this disclosure. In other words, the top reference block of the below neighboring block is a block in the below neighboring block that is adjacent to the co-located block. Top reference block 840 shown in FIG. 8 is the leftmost reference block of the top reference blocks. While center reference block 810 inside co-located block 630 is used as a co-located reference block, other co-located reference blocks inside co-located block 630 may also be used. A co-located reference block inside the co-located block is referred to as an inside reference block. FIG. 9 illustrates another example of using more than one co-located reference blocks where the co-located reference blocks include the above-left reference block 610, above-left reference block 910 of the co-located block, leftmost reference block 820 of right neighboring block 830 of the co-located block, and top reference block 840 of a below neighboring block 850 of the co-located block in the Inter or Skip mode. In order to differentiate the two above-left reference blocks 610 and 910 when needed, above-left reference block 610 of bottom-right neighboring block 620 of co-located block 630 is referred to as the first above-left reference block while above-left reference block 910 of co-located block 630 is referred to as the above-left reference block. While the co-located reference blocks shown in FIG. 8 and FIG. 9 are used to derive temporal MVP in the Inter or Skip mode, the co-located reference blocks shown in FIG. 8 and FIG. 9 may also be used to derive temporal MVP in the Merge mode.

In another embodiment according to the present invention, when two or more co-located reference blocks are used, the MVP derivation will starts MVP search based on first above-left reference block 610 of bottom-right neighboring block 620 of co-located block 630. If no MVP can be found, the MVP derivation will continue MVP search based on other co-located reference blocks. If the MVP still cannot be found, the MVP can be set to zero or a default value.

In another embodiment according to the present invention, when the MVP found by the MVP derivation is the same as a previously found MVP, the MVP derivation will continue to find an MVP different from the previously found MVP. If the MVP still cannot be found, the MVP can be set to zero or a default value. The previously found MVP is the MVP found during the search over spatial MVP candidates, where the MVP search is first performed based on the spatial neighboring blocks above the current block and to the left of the current block before the MVP search is performed based on the co-located block.

In this disclosure, exemplary configurations of co-located reference blocks have been provided to illustrate embodiments according to the present invention. While separate exemplary configurations have been provided for the Inter/Skip mode and Merge mode, the exemplary configuration for the Inter/Skip mode is applicable to Merge mode, and vice versa. Furthermore, separate exemplary search schemes have been provided for the Inter/Skip mode and Merge mode. However, the search scheme for the Inter/Skip mode is applicable to Merge mode, and vice versa. Furthermore, while several configurations of co-located reference blocks are illustrated as examples, a skilled person in the field may practice the present invention using other configurations with departing from the spirit of the present invention.

Embodiment of MVP derivation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore indicated by the appended claims rather than by the foregoing description. All changes which come within the meaning and range of equivalency of the claims are to be embraced within their scope.

The invention claimed is:

1. A method of deriving a motion vector predictor (MVP) for a motion vector (MV) of a current block of a current picture in Inter, or Merge, or Skip mode, wherein the MV is associated with the current block and a corresponding block of a target reference picture in a given reference list, the method comprising:
   determining one or more co-located reference blocks including a bottom-right neighboring block of a co-located block;
   determining the MVP for the current block based on one or more reference MVs (motion vectors) associated with said one or more co-located reference blocks including the bottom-right neighboring block of the co-located block, wherein one reference MV of the bottom-right neighboring block is used as the MVP if the bottom-right neighboring block is selected as a candidate block; and
   providing the MVP for the current block.

2. The method of claim 1, wherein said one or more co-located reference blocks further comprise an inside reference block of the co-located block.

3. The method of claim 2, wherein the inside reference block is a center reference block of the co-located block.

4. The method of claim 3, wherein said one or more co-located reference blocks further comprise a leftmost reference block of a right neighboring block of the co-located block, a top reference block of a bottom neighboring block of the co-located block.

5. The method of claim 2, wherein the inside reference block is an above-left reference block of the co-located block, and wherein said one or more co-located reference blocks further comprise a leftmost reference block of a right neighboring block of the co-located block or a top reference block of a bottom neighboring block of the co-located block.

6. The method of claim 1, wherein the bottom-right neighboring block of the co-located block is used for said determining the MVP in the Inter or the Skip mode, and one of said one or more co-located reference blocks different from the bottom-right neighboring block of the co-located block is used for said determining the MVP in the Merge or the Skip mode.

7. The method of claim 1, wherein said determining the MVP is based on said one or more reference MVs associated with said one or more co-located reference blocks different from the bottom-right neighboring block of the co-located block, if said determining the MVP based on said one or more reference MVs associated with the bottom-right neighboring block of the co-located block does not find the MVP.

8. The method of claim 1, wherein the MVP is ignored and said determining the MVP continues to find the MVP if the MVP found according to said determining the MVP is same as a previous MVP derived from neighboring blocks of the current block.

9. The method of claim 1, wherein said determining the MVP based on said one or more reference MVs uses a search order, wherein the search order depends on a prediction mode selected from a group consists of the Inter mode, the Skip mode and the Merge mode.

10. An apparatus for deriving a motion vector predictor (MVP) for a motion vector (MV) of a current block of a current picture in Inter, or Merge, or Skip mode, wherein the MV is associated with the current block and a corresponding block of a target reference picture in a given reference list, the apparatus comprising:
means for determining one or more co-located reference blocks including a bottom-right neighboring block of a co-located block;
means for determining the MVP for the current block based on said one or more reference MVs (motion vectors) associated with said one or more co-located reference blocks including the bottom-right neighboring block of the co-located block, wherein one reference MV of the bottom-right neighboring block is used as the MVP if the bottom-right neighboring block is selected as a candidate block; and
means for providing the MVP for the current block.

11. The apparatus of claim 10, wherein said one or more co-located reference blocks further comprise an inside reference block of the co-located block.

12. The apparatus of claim 11, wherein the inside reference block is a center reference block of the co-located block.

13. The apparatus of claim 12, wherein said one or more co-located reference blocks further comprise a leftmost reference block of a right neighboring block of the co-located block, a top reference block of a bottom neighboring block of the co-located block.

14. The apparatus of claim 11, wherein the inside reference block is an above-left reference block of the co-located block, and wherein said one or more co-located reference blocks further comprise a leftmost reference block of a right neighboring block of the co-located block or a top reference block of a bottom neighboring block of the co-located block.

15. The apparatus of claim 10, wherein the bottom-right neighboring block of the co-located block is used for said means for determining the MVP in the Inter or the Skip mode, and one of said one or more co-located reference blocks different from the bottom-right neighboring block of the co-located block is used for said means for determining the MVP in the Merge or the Skip mode.

16. The apparatus of claim 10, wherein said means for determining the MVP is based on said one or more reference MVs associated with said one or more co-located reference blocks different from the bottom-right neighboring block of the co-located block, if said means for determining the MVP based on said one or more reference MVs associated with the bottom-right neighboring block of the co-located block does not find the MVP.

17. The apparatus of claim 10, wherein the MVP is ignored and said means for determining the MVP continues to find the MVP if the MVP found according to said means for determining the MVP is same as a previous MVP derived from neighboring blocks of the current block.

18. The apparatus of claim 10, wherein said means for determining the MVP based on said one or more reference MVs uses a search order, wherein the search order depends on a prediction mode selected from a group consists of the Inter mode, the Skip mode and the Merge mode.

* * * * *